(12) United States Patent
Zhao

(10) Patent No.: US 11,383,784 B2
(45) Date of Patent: Jul. 12, 2022

(54) CHILD BALANCE BIKE

(71) Applicant: Hangzhou Asweets Cultural Creative Co., Ltd., Hangzhou (CN)

(72) Inventor: Fujian Zhao, Hangzhou (CN)

(73) Assignee: Hangzhou Asweets Cultural Creative Co., Ltd., Hangzhou (CN)

( * ) Notice: Subject to any disclaimer, the term of this patent is extended or adjusted under 35 U.S.C. 154(b) by 173 days.

(21) Appl. No.: 16/826,399

(22) Filed: Mar. 23, 2020

(65) Prior Publication Data
US 2021/0094646 A1 Apr. 1, 2021

(30) Foreign Application Priority Data

| Sep. 26, 2019 | (CN) | 201921619739.5 |
| Sep. 26, 2019 | (CN) | 201921620314.6 |
| Sep. 26, 2019 | (CN) | 201921620391.1 |
| Sep. 26, 2019 | (CN) | 201921635338.9 |

(51) Int. Cl.
*B62M 1/00* (2010.01)
*B62J 50/40* (2020.01)

(52) U.S. Cl.
CPC .................. *B62J 50/40* (2020.02)

(58) Field of Classification Search
CPC ... B62J 50/40; B62K 9/00; B62K 9/02; A63G 19/00; A63G 19/02; A63G 19/04; A63G 19/18; A63G 19/20; A63G 13/06; A63G 15/00; A63G 15/04; A63G 17/00; A63H 17/00; A63H 17/16; A63H 17/18; A63H 17/25; A63H 17/26; A63H 17/262; A63H 7/00; A63H 7/04
See application file for complete search history.

(56) References Cited

U.S. PATENT DOCUMENTS

| 1,499,884 | A | * | 7/1924 | Singer | A63G 19/02 280/1.14 |
| 2,006,349 | A | * | 7/1935 | Fowler | B62K 3/00 280/1.202 |
| 2,643,133 | A | * | 6/1953 | Lucchesi | B62K 9/00 280/1.202 |
| 2,646,990 | A | * | 7/1953 | Fowler | A63G 19/20 280/1.189 |
| 2,707,102 | A | * | 4/1955 | Wendt | A63G 17/00 446/28 |
| 2,842,379 | A | * | 7/1958 | Campo | A63H 3/003 280/1.204 |
| 2,883,202 | A | * | 4/1959 | Morgan | B62K 9/02 280/1.194 |

(Continued)

*Primary Examiner* — James M Dolak

(57) ABSTRACT

A child balance bike includes a bike body and a coat. The bike body includes a frame, a stem and wheels. The coat includes a main coat body and a head body, wherein the main coat body is provided with lower ends corresponding to legs of an animal, and an inside of the lower ends is provided with an end pocket and a locking portion. The main coat body and the head body are connected as a whole behind the stem, a portion of the coat behind the stem is a filling housing segment through which the head body and the main coat body penetrates and filled with a filler, and the head body is hung on the stem through the filling housing segment filled with the filler. The present invention has a simple structure and convenient operation for connecting.

6 Claims, 8 Drawing Sheets

(56) References Cited

U.S. PATENT DOCUMENTS

| | | | | |
|---|---|---|---|---|
| 3,026,117 A * | 3/1962 | Clark | ............... | A63G 19/02 |
| | | | | 280/1.194 |
| 3,051,501 A * | 8/1962 | Bunn | ............... | B62K 9/02 |
| | | | | 280/1.188 |
| 3,259,395 A * | 7/1966 | Blair | ............... | B62K 3/00 |
| | | | | 280/1.203 |
| 3,999,771 A * | 12/1976 | Lohr | ............... | A63G 15/02 |
| | | | | 280/1.13 |
| 4,066,271 A * | 1/1978 | Lohr | ............... | A63G 15/02 |
| | | | | 280/1.182 |
| 4,497,500 A * | 2/1985 | Mercurio | ............... | A63G 19/00 |
| | | | | 267/248 |
| 4,971,342 A * | 11/1990 | Dix | ............... | A63G 19/02 |
| | | | | 280/1.13 |
| 5,549,313 A * | 8/1996 | James | ............... | A63G 19/02 |
| | | | | 280/1.13 |
| 6,139,061 A * | 10/2000 | Lewis | ............... | A63G 19/18 |
| | | | | 280/828 |
| 6,499,747 B2 * | 12/2002 | Fagan | ............... | A63G 19/12 |
| | | | | 280/1.191 |
| 6,551,164 B1 * | 4/2003 | Motosko | ............... | A63G 1/30 |
| | | | | 280/1.13 |
| 8,827,279 B1 * | 9/2014 | Clark | ............... | A63G 19/20 |
| | | | | 280/1.202 |
| 9,211,476 B2 * | 12/2015 | Curry, Sr. | ............... | A63G 19/00 |

* cited by examiner

CHILD BALANCE BIKE

BACKGROUND OF THE INVENTION

Field of the Invention

The present invention relates to a field of balance bike, and more particularly to, a child balance bike.

Description of Related Art

Currently, for two-wheeled child balance bikes, a coat in the form of outfit is sheathed outside the balance bike. The coat includes a main coat body and a head body, which are sheathed outside the bike body and are combined to form an animal shape combined on the balance bike. The head body and the main coat body of the balance bike are both made of a cloth cover and filling materials, the head body and the main body are connected by a continuous cloth at the back of the animal-shaped neck, and the head body is hung on the stem through the continuous cloth. With the connection and fixing manner of this structure, not only the head body is easy to droop and the form is not upright, but also the structure in which the head body is connected with the main body is easily to be torn. When the balance bike falls to the ground, the head body swings at will, which is not only unattractive, but also easily tears the connection structure at the rear. How to connect the coat to the bike body reliably and conveniently has a positive significance for the safe use of the balance bike.

SUMMARY OF THE INVENTION

In view of the drawbacks of the prior art, the present invention provides a child balance bike.

In order to solve the above technical problems, the present invention adopts the following technical solutions:

A child balance bike includes a bike body and a coat. The bike body includes a frame, a stem and wheels. The coat includes a main coat body and a head body, wherein the main coat body is provided with lower ends corresponding to legs of an animal, and an inside of the lower ends is provided with an end pocket and a locking portion. The main coat body and the head body are connected as a whole behind the stem, a portion of the coat behind the stem is a filling housing segment through which the head body and the main coat body penetrates and filled with a filler, and the head body is hung on the stem through the filling housing segment filled with the filler.

In one embodiment, the end pocket is sheathed on the frame, and the locking portion is located above the end pocket. The locking portion is connected to the frame through a detachable connection structure, and the detachable connection structure is selected from a Velcro connection, a belt connection, and a button connection.

In one embodiment, the main coat body is provided with four lower ends corresponding to four legs of the animal, the end pockets and the locking portions of the four lower ends are respectively connected to a front cross end and a rear cross end of the frame, and the end pockets and locking portions are located on both sides of an axle, wherein the end pocket is sheathed at the ends, and the locking portion is detachably connected to the frame at the other side of the axle.

In one embodiment, the main coat body and the head body are connected as a whole behind the stem, and are hung on the stem through the connection. In front of the stem, a lower portion of the head body and a side of the main coat body adjacent to the head body are connected as a whole through two curved zippers.

In one embodiment, the main coat body is penetrated and sleeved on the bike body through an intermediate zipper, and the two curved zippers are located respectively at both sides of the intermediate zipper to form a Y-shaped zipper configuration.

In one embodiment, the two curved zippers are configured such that the two curved zippers are inclined to be low in the front and high in the rear along a front projection direction of a side of the balance bike after the coat is worn on the balance bike.

In one embodiment, a portion of the main coat body adjacent to the head body are provided with independent filling pockets at left and right sides, and the filling pockets are bulged after being filled with the filler to support the head body upward.

In one embodiment, the filling pockets and the bulged form are configured such that the bulged form is compressed by the head body above after the coat is worn on and the two curved zippers are pulled up.

In one embodiment, the filler is selected from an elastic batting, cotton and sponges.

In one embodiment, the division between the head body and the side of the main coat body adjacent to the head body is defined as being inclined to be low in the front and high in the rear along a front projection direction of a side of the balance bike after the coat is worn on the balance bike.

Since the above technical solutions are adopted, the present invention has the following beneficial effects:

A child balance bike is provided in the present invention. The present invention has a simple structure and convenient operation for connecting, in which a reliable connection is established between the bottom of the coat and the balance bike, so that more sufficient support and more balanced support may be provided for the head body after the coat is worn on the bike body. The balance bike not only enhances the connection and fixation of the head body, but also provides a more strong integrity and convenient connection for connection and installation of the coat, so that the animal shape worn on the balance bike becomes more upright and vivid.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

Figure 1:
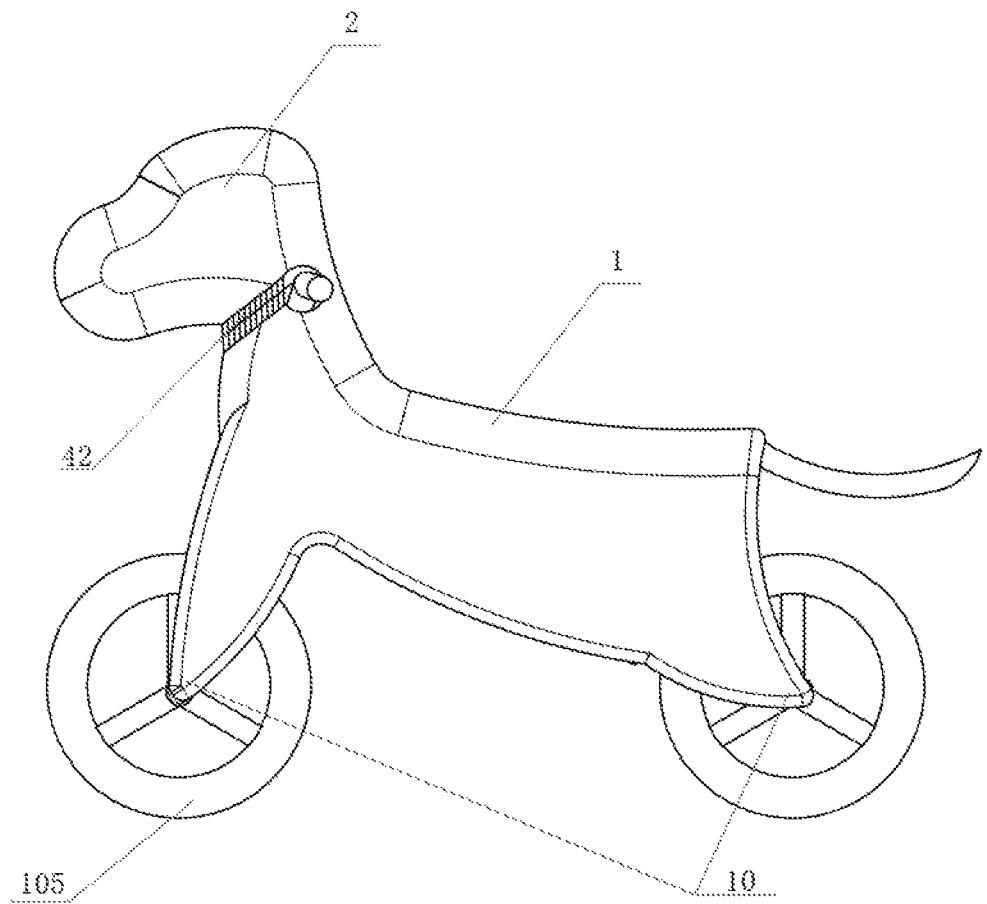
FIG. 1 is a side view of a child balance bike according to an embodiment of the present invention.
Figure 2:
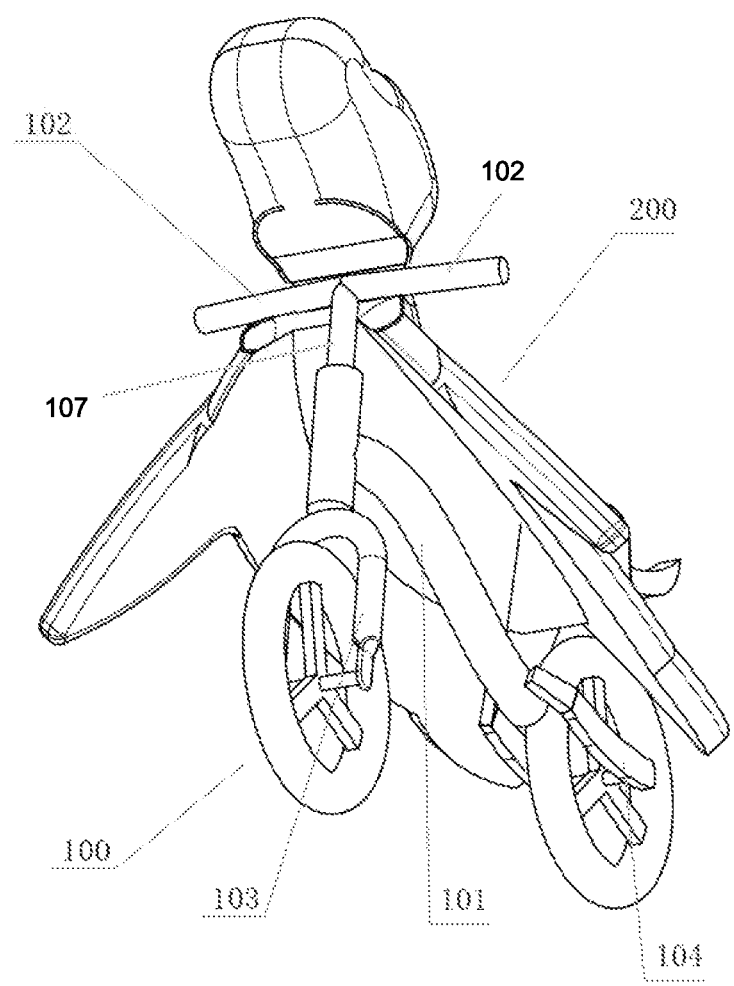
FIG. 2 is a diagram showing a situation where the coat is ready to be worn on the two-wheeled balance bike according to an embodiment of the present invention.

In order that the objectives, technical schemes and advantages of the present invention will become more apparent, the present invention will be described in more detail with reference to the drawings and examples above. It should be understood that the specific embodiments described herein are only for illustrating but not for limiting the present invention. In addition, in the following description, descriptions of well-known structures and technologies are omitted to avoid unnecessarily obscuring the concept of the present invention.

As shown in FIGS. 1 to 8, a child balance bike in the present invention includes a bike body 100 and a coat 200. The bike body 100 includes a frame 101, a stem 107 two handlebars 102 and wheels 105. The coat 200 may be made into different animal shapes, such as a dog shape, a deer shape, a bear shape, a tiger shape, a unicorn shape, a leopard shape, and a horse shape, all of which include a main coat body 1 and a head body 2, wherein the main coat body 1 and the head body 2 are all filling housings, which are cloth coats and filled with a filler such as elastic batting, cotton, sponges and other soft bodies.

Figure 5:
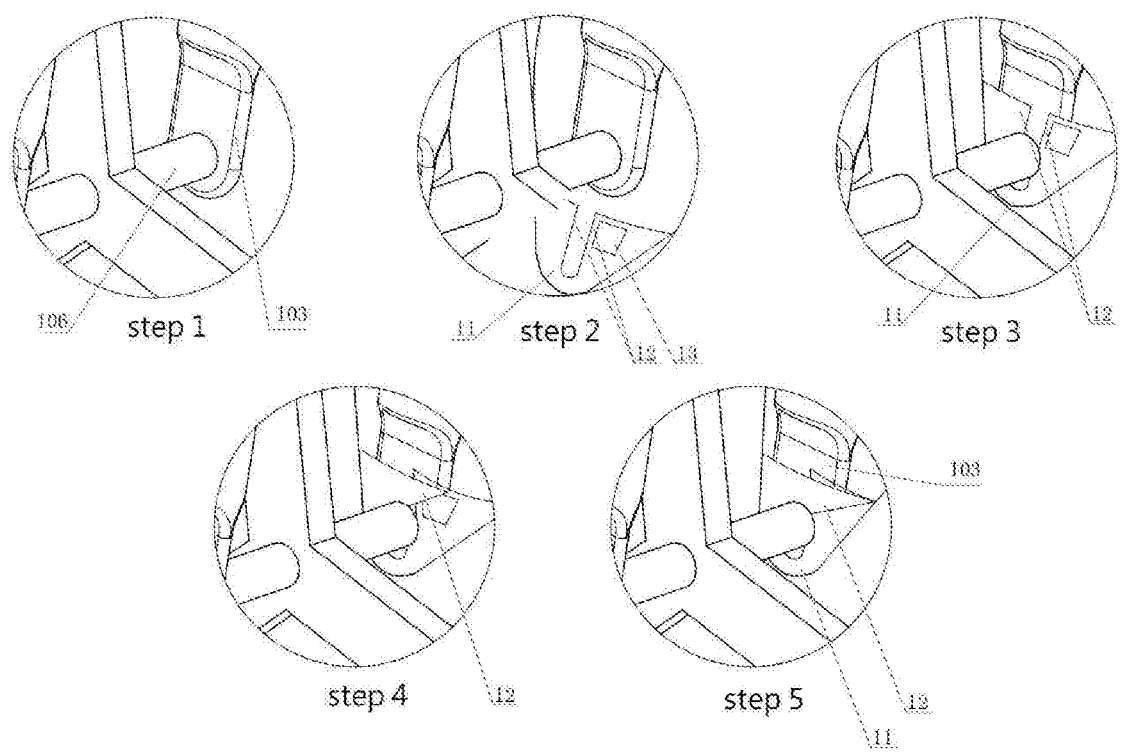
FIG. 5 is a diagram of operation steps for connecting an end pocket and a locking portion according to an embodiment of the present invention.

Please refer to FIG. 5. FIG. 5 is a diagram of operation steps for connecting an end pocket and a locking portion according to an embodiment of the present invention. The main coat body 1 is provided with lower ends 10 corresponding to legs of an animal, and the inside of the lower ends 10 are provided with an end pocket 11 and a locking portion 12.

The end pocket 11 is sheathed on the frame 101, and the locking portion 12 is located above the end pocket 11. The locking portion 12 is connected to the frame 101 through a detachable connection structure, and the detachable connection structure is selected from a Velcro connection, a belt connection, and a button connection. In this embodiment, the Velcro connection is adopted.

As shown in FIG. 5, the main coat body 1 is provided with four lower ends 10 corresponding to four legs of the animal, and the four lower ends 10 are provided with the end pockets 11 and the locking portions 12. The end pockets 11 and the locking portions 12 of the four lower ends 10 are respectively connected to a front cross end 103 and a rear cross end 104 of the frame 101, a front axle and a rear axle (see Step 1 of FIG. 5, the front axle is denoted by reference numeral 106) are respectively connected to the front cross end 103 and the rear cross end 104, and the end pockets 11 and locking parts 12 are located on both sides of the axle, wherein the end pocket 11 is sheathed at the end to hold bottoms of the front cross end 103/the rear cross end 104 (see Step 2 of FIG. 5), and the locking portion 12 is detachably connected to the frame 101 at the other side of the axle. As shown in FIG. 5, in operation, the fixed connection of the lower end 10 may be achieved only by sheathing the end pocket 11 to hold a bottom of the front cross end 103/the rear cross end 104 (i.e., Step 3 of FIG. 5), passing one end of the locking portions 12 around the frame 101 (i.e., Step 4 of FIG. 5) and sticking the other end of the locking portions 12 with the Velcro 13 (i.e., Step 5 of FIG. 5).

Figure 3:
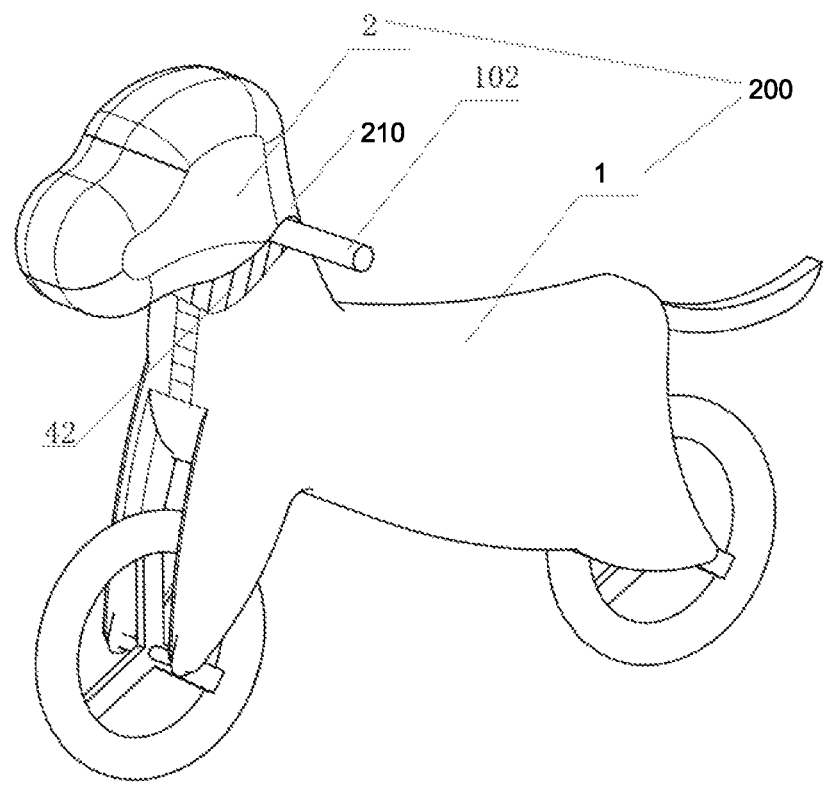
FIG. 3 is an overall diagram showing a situation where the coat is worn on the balance bike according to an embodiment of the present invention.
Figure 4:
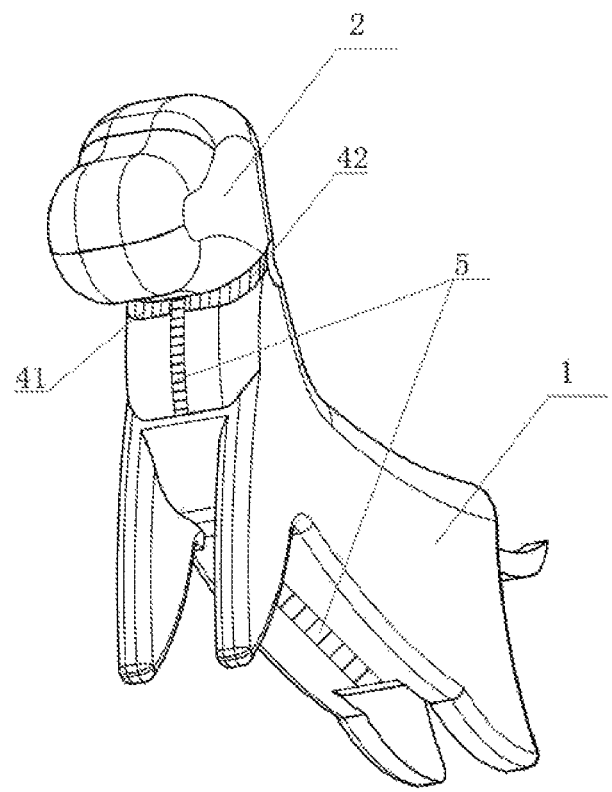
FIG. 4 is a diagram showing a situation where only the coat is left after the bike body is hidden in FIG. 3 according to an embodiment of the present invention.

As shown in FIG. 3 and FIG. 4, at the bike head, the main coat body 1 and the head body 2 are connected as a whole behind the two handlebars 102, and the head body 2 is hung on the two handlebars 102 through the coat connection 210. In front of the two handlebars 102, a lower portion of the head body 2 and a portion of the main coat body 1 adjacent to the head body 2 are connected as a whole through two curved zippers 41, 42.

As shown in FIG. 4, the main coat body 1 is penetrated and sleeved on the bike body 100 through an intermediate zipper 5, and the two curved zippers 41, 42 are located respectively at both sides of the intermediate zipper 5 to form a Y-shaped zipper configuration. In this way, the connection between the head body 2 and the main coat body 1 is ensured, so that the connection and fixation of the head body 2 may be enhanced, and the integrity for the connection and installation of the coat 200 is stronger, hence facilitating the connecting operation and production.

As shown in FIG. 1, the two curved zippers 41, 42 are configured such that the two curved zippers 41, 42 are inclined to be low in the front and high in the rear along a front projection direction of a portion of the balance bike after the coat 200 is worn on the balance bike. In this way, the connection structure has better stress, which may avoid wrinkles, and also facilitates the support of the main coat body 1 to the head body 2.

Figure 6:
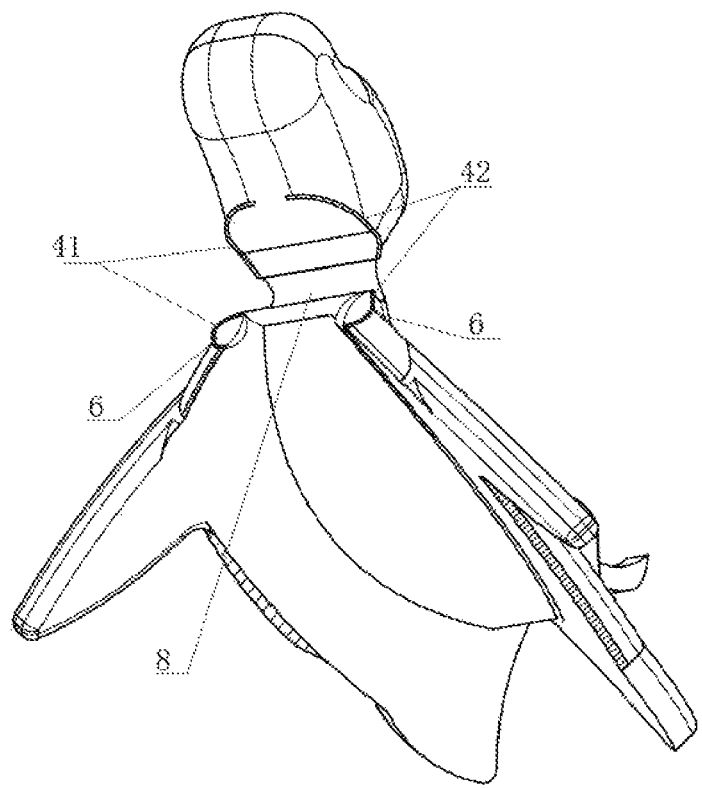
FIG. 6 is a diagram showing a situation where only the coat is left after the bike body is hidden in FIG. 2 according to an embodiment of the present invention.
Figure 7:
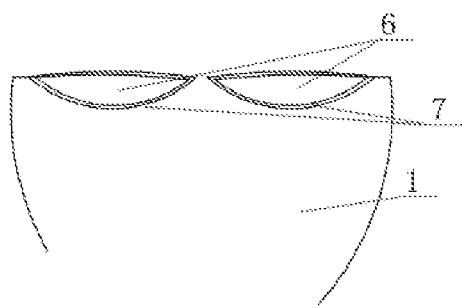
FIG. 7 is a diagram showing a situation where the main coat body adjacent to a portion of the head body when the main coat body is expanded according to an embodiment of the present invention.

As shown in FIG. 6 and FIG. 7, the portion of the main coat body 1 adjacent to the head body 2 are provided with independent filling pockets 6 at left and right sides, and a quilting line 7 is formed between the filling pocket 6 and the filling housing of the main coat body 1, so that the filling pocket 6 is separated from the filling housing of the main coat body 1 to fill the filling pocket 6 separately. The filling pockets 6 are bulged after being filled with the filler and protrude from a thickness of the main coat body 1 formed by filling to support the head body 1 upward and to be able to engage with the zippers 41, 42, so as to provide a good support for the head body 2 and make the animal shape worn on the balance bike become more upright and vivid.

The filling pockets 6 and the bulged form are configured such that the bulged form is compressed by the head body 2 above after the coat is worn on and the two curved zippers are pulled up.

Figure 8:
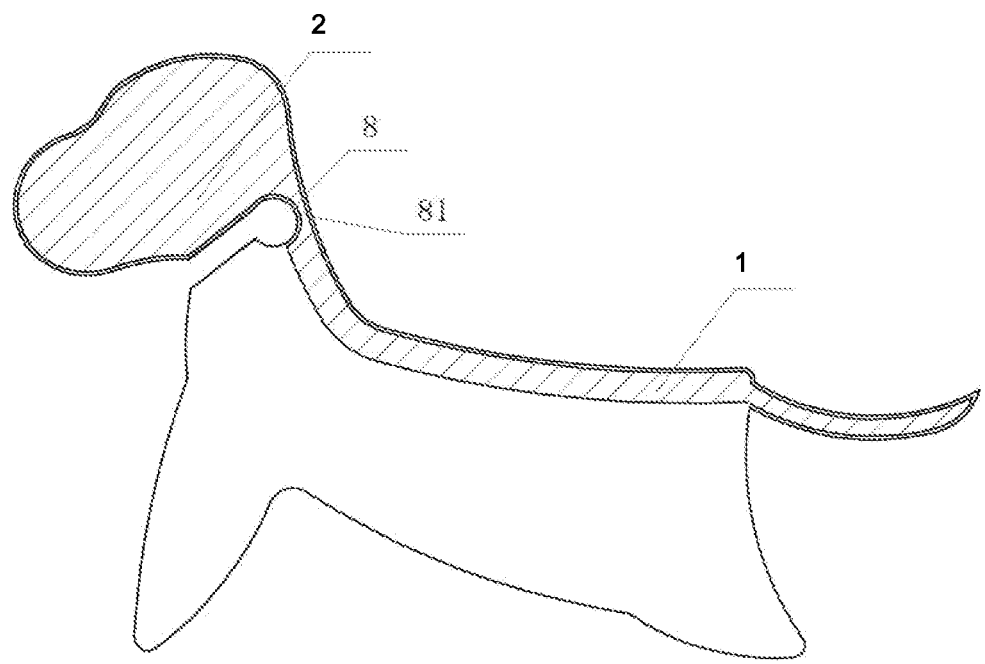
FIG. 8 is a sectional view of the child balance bike according to an embodiment of the present invention.

As shown in FIG. 8, a portion of the coat 200 behind the two handlebars 102 is a filling housing segment 8 through which the head body 2 and the main coat body 1 penetrates and filled with a filler 81, and the filling housings of the head body 2 and the main coat body 1 are penetrated through by the filling housing segment 8 to be a whole. The fillers 81 are filled together when the head body 2 and the main coat body 1 are filled, and the head body 2 is hung on the two handlebars 102 through the filling housing segment 8 filled by the fillers 81, so that the safety of toddlers riding the balanced bike is improved, the sense of uprightness of the animal shape worn on the balanced bike is strengthened, and the connection strength is increased.

The above are only specific embodiments of the present invention, but the technical features of the present invention are not limited thereto. Any simple changes, equivalent replacements, or modifications made based on the present invention to solve basically the same technical problems and achieve basically the same technical effects fall within the scope of the present invention.

What is claimed is:

1. A child balance bike, comprising:
a bike body, comprising a frame, a stem, two handlebars and wheels; and
a coat, comprising a main coat body and a head body, wherein the main coat body is provided with lower ends corresponding to legs of an animal, and an inside of the lower ends is provided with an end pocket and a locking portion;
wherein the main coat body and the head body are connected as a whole behind the two handlebars, a portion of the coat behind the two handlebars is a filling housing segment through which the head body and the main coat body penetrates and filled with a filler, and the head body is hung on the two handlebars through the filling housing segment filled with the filler;
wherein the end pocket is sheathed on the frame, and the locking portion is located above the end pocket; and the locking portion is connected to the frame through a detachable connection structure, and the detachable connection structure is a Velcro connection;
wherein the main coat body is provided with four lower ends corresponding to four legs of the animal, the end pockets and the locking portions of the four lower ends are respectively connected to a front cross end and a rear cross end of the frame, and the end pockets and locking portions are located on both sides of an axle; the end pocket is sheathed at the lower ends, and the locking portion is detachably connected to the frame at the other side of the axle;
wherein a fixed connection of the lower end is achieved by sheathing the end pocket to hold a bottom of the front cross end or the rear cross end, passing one end of the locking portion around the frame and sticking the other end of the locking portion with the Velcro connection.

2. The child balance bike in claim 1, wherein the main coat body and the head body are connected as a whole behind the two handlebars through a coat connection, and are hung on the two handlebars through the coat connection; in front of the two handlebars, a lower portion of the head body and a portion of the main coat body adjacent to the head body are connected as a whole through two curved zippers.

3. The child balance bike in claim 2, wherein the main coat body is penetrated and sleeved on the bike body through an intermediate zipper, and the two curved zippers are located respectively at both sides of the intermediate zipper to form a Y-shaped zipper configuration.

4. The child balance bike in claim 2, wherein the two curved zippers are inclined to be low in a front side and high in a rear side along a front projection direction of a side of the child balance bike after the coat is worn on the child balance bike.

5. The child balance bike in claim 2, wherein a portion of the main coat body adjacent to the head body are provided with independent filling pockets at left and right sides, and the filling pockets are a bulged form after being filled with the filler to support the head body upward.

6. The child balance bike in claim 5, wherein the bulged form is compressed by the head body above after the coat is worn on the child balance bike and the two curved zippers are pulled up.

* * * * *